(12) United States Patent
Pistemaa et al.

(10) Patent No.: US 6,233,162 B1
(45) Date of Patent: May 15, 2001

(54) COMPOUNDED POWER FACTOR CORRECTED UNIVERSAL DISPLAY MONITOR POWER SUPPLY

(75) Inventors: Jari Pistemaa, Hiisi; Raimo Ikonen, Salo, both of (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/501,026

(22) Filed: Feb. 9, 2000

(51) Int. Cl.[7] .................................................. H02M 3/335
(52) U.S. Cl. .............................. 363/21; 315/194; 315/219
(58) Field of Search .............................. 363/21, 131, 97; 315/194, 247, 291, 219, 221

(56) References Cited

U.S. PATENT DOCUMENTS

| | | | |
|---|---|---|---|
| 4,345,187 | * | 8/1982 | Casper, Jr. ............................ 315/408 |
| 5,013,998 | * | 5/1991 | Varga et al. ......................... 323/285 |

FOREIGN PATENT DOCUMENTS 0673106   9/1995   (EP) .

OTHER PUBLICATIONS

"TDA 4862" Datasheet, Technical Disclosure, by Siemens, dated Feb. 16, 1998, pp. 4–8.

* cited by examiner

Primary Examiner—Shawn Riley
(74) Attorney, Agent, or Firm—Ware, Fressola, Van Der Sluys & Adolphson, LLP

(57) ABSTRACT

A power supply circuit for powering a display monitor has a switching mode power supply (SMPS) circuit and a voltage phase information (VPI) combiner circuit. The SMPS circuit responds to a mains voltage signal (i.e. mains input) and to a voltage phase information combiner signal (VFB) from the VPI combiner circuit, for providing three different signals. The VPI combiner signal (VFB) contains information about a phase relationship between a current drawn by the switching mode power supply and a voltage of the mains voltage signal. The first two signals are provided back to the VPI combiner circuit, and include a voltage phase information signal (VPI) containing information about a voltage phase of the mains voltage signal, and a voltage feedback signal containing information the voltage of the switching mode power supply signal. The third signal is a switching mode power supply signal for powering the monitor. The VPI combiner circuit responds to the voltage phase information signal (VPI) and the voltage feedback signal, for providing the voltage phase information combiner signal (VFB) to the switching mode power supply circuit for shaping the current drawn by the switching mode power supply to substantially follow the phase of the mains voltage signal.

37 Claims, 12 Drawing Sheets

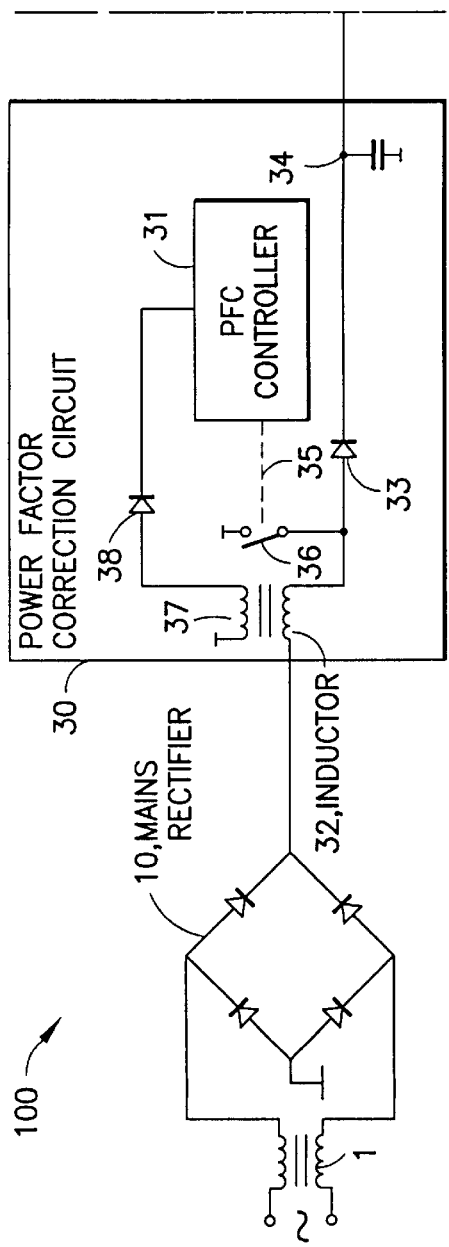

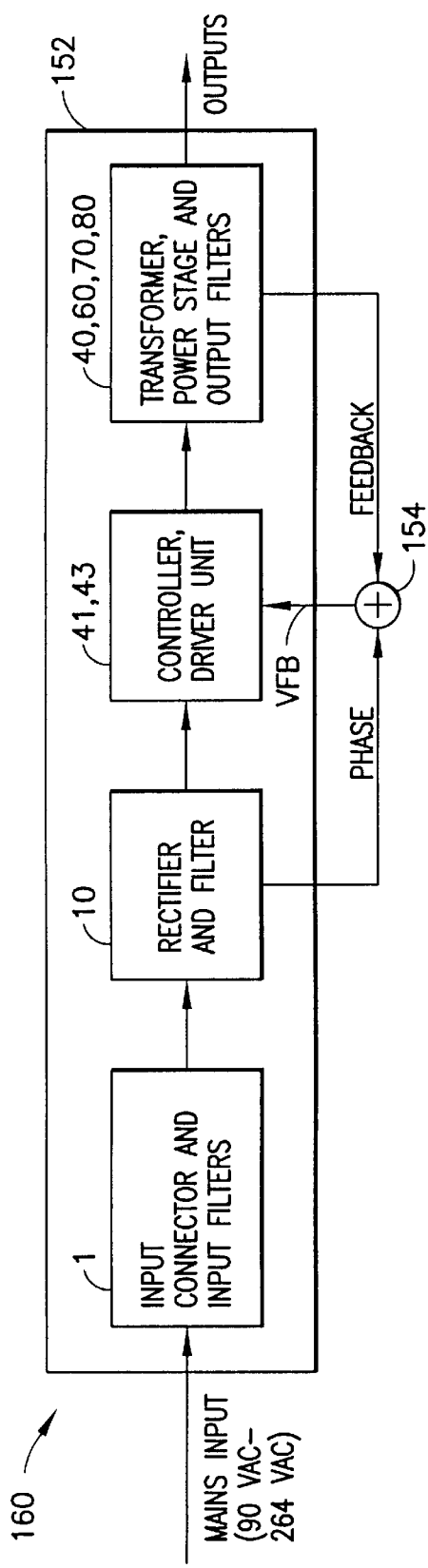
FIG.2B (VOLTAGE MODULATED SYSTEM)
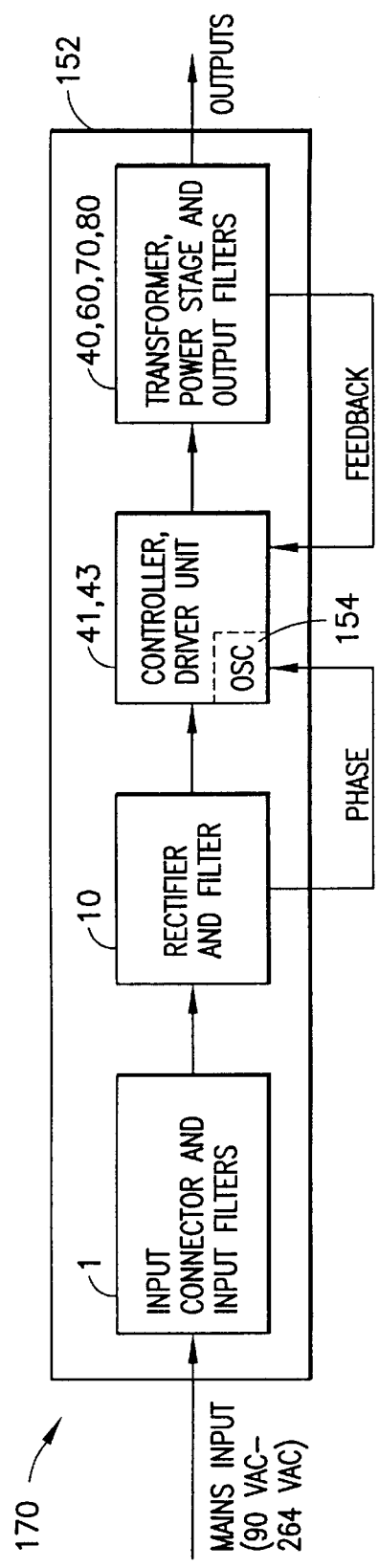
FIG.2C (FREQUENCY MODULATED SYSTEM)

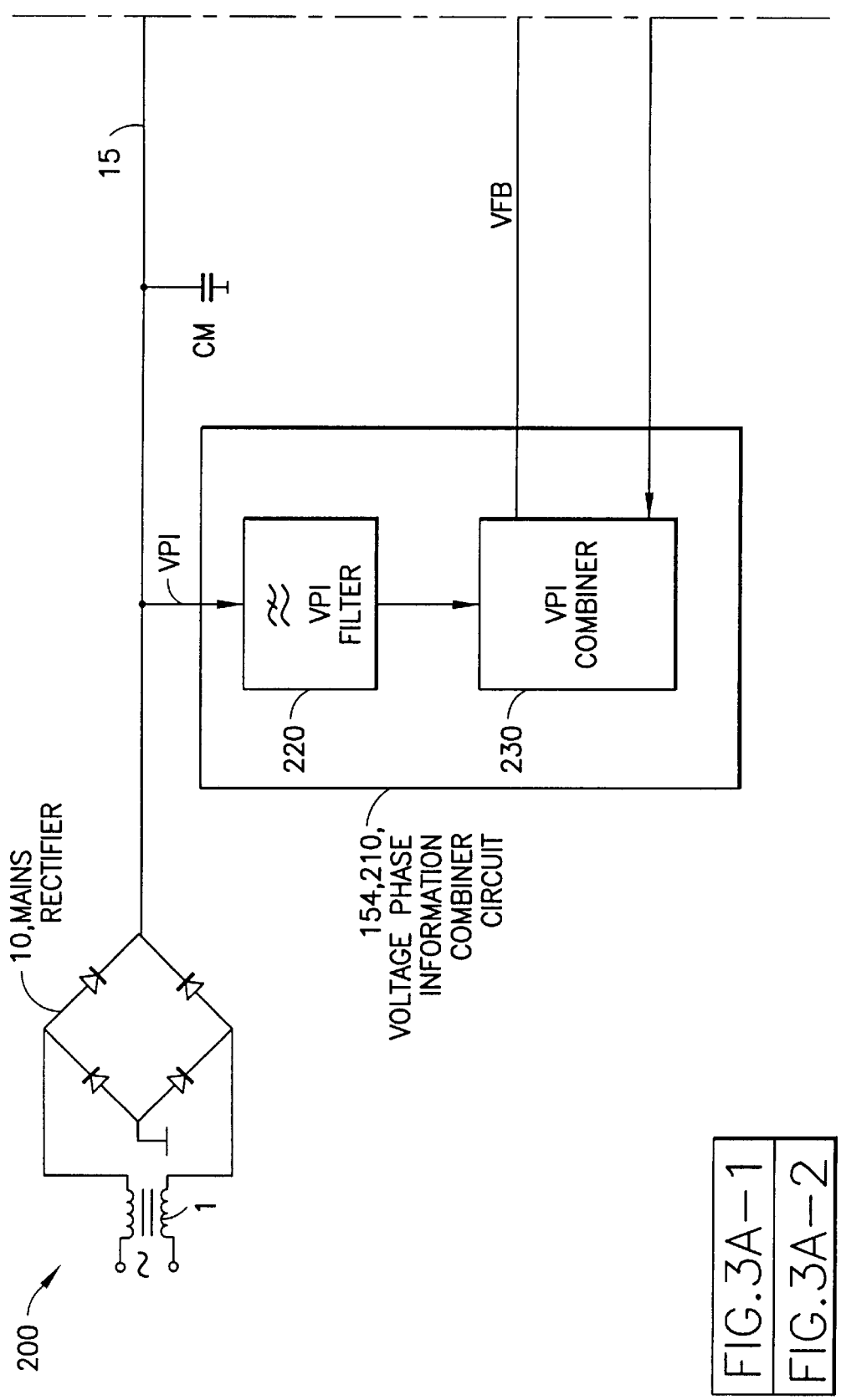

COMPOUNDED POWER FACTOR CORRECTED UNIVERSAL DISPLAY MONITOR POWER SUPPLY

BACKGROUND OF THE INVENTION

1. General Purpose of the Invention

The present invention relates to a power supply circuit; and more particularly to a power supply circuit for a monitor having a switching mode power supply (SMPS) circuit with a Power Factor Correction circuit (PFC).

2. Description of Related Art

Traditionally, a PFC circuit is used in devices with high wattage, which improves the power of an alternating-current transmission system so the voltage and the current are substantially in phase. But an increasing number of lower wattage devices, like personal computers (PCs) having display monitors, provide a remarkable potential for saving power by equipping them with a PFC circuit. Display monitors may also include other display devices which can be connected to a mains voltage and based, for instance, on cathode ray tube, liquid crystal or projection-type display technology.

It is known in the art to use a separate PFC circuit between a mains outlet and a power consuming device. For example, EP 0 673 106 A1 discloses circuits for achieving a higher power factor in a switched mode power supply. FIG. 2 of EP 0 673 106 A1 shows a circuit having a step-up regulator arranged between a bridge-type rectifier and an AC energy distribution source that includes a capacitor C, a transformer M, a controller CTRL1, a switch S1, a diode D2 and a capacitor C2. The reader is also referred to a technical disclosure by Siemens identified as the TDA 4862 datasheet.

It is also known in the art to add a PFC module inside a housing of such a power consuming device.

Moreover, many devices have a universal power supply, i.e., the same power supply is able to operate with a large value of the mains voltages, for instance, in U.S. (110V) and in Europe (230V).

There is a need in the art to: (1) find an economical solution where additional control circuitry for the PFC circuit is minimized by sharing an existent power supply controller for controlling power factor correction; (2) make a PFC circuit controllable according to the mains voltage of the display monitor; and (3) equip display monitor power supplies with a PFC circuit which are also universal, i.e., properties of a PFC circuit are controlled according to the operating situation. The PFC inductor is large, heavy and expensive and there is a need to do PFC without adding an extra inductor.

In the art, universal monitors which cover both mains voltage types are working typically with a mains voltage range of 90V, . . . , 265V.

FIG. 1 (Prior Art): Basic Power Supply Circuit for a Display Monitor

In particular, FIG. 1, including FIGS. 1A and 1B, shows a basic power supply circuit generally indicated as 100 for a display user interface such as a display monitor 95, which includes a mains filter 1, a mains rectifier 10, a power factor correction circuit 30, a main power supply 40, deflection circuits 60, 70, a video amplifier 80 and a microcontroller 90.

In FIG. 1A, the mains rectifier 10 provides a mains rectifier signal having a current and voltage having a certain phase relationship.

The power factor correction circuit 30 includes a PFC controller 31, an inductor 32, a diode 33, a capacitor 34, a control line 35 and a switch 36. The PFC circuit 30 and also the PFC controller 31 are known in prior art. See the supply voltage generation in Siemens' FIG. 3 of the TDA 4862 datasheet, which is a known prior art method. The PFC controller 31 monitors both the incoming full-wave rectified mains voltage and the voltage in the capacitor 34. The product of these voltages is used to control the pulse ratio of the switch 36 so that the waveform of the current drawn from the mains corresponds to the waveform of the voltage. In FIG. 1, the combination of a transformer 37, a diode 38 and a capacitor 39 provides for the voltage generation to the PFC circuit 30. In operation, the alternating flux of the coil 32 induces alternating voltage in the winding 37, which is rectified by the diode 38. One disadvantage of the display monitor power supply circuit 100 is that it needs extra components included in the PFC circuit 30.

In FIG. 1B, the main power supply 40 includes a switching mode power supply (SMPS) controller 41, a transformer 42, a switch 43, a feedback loop 44, an isolator 45, diodes 46a, 46b, 46c, a feedback resistor 47 and a reference voltage diode 48. The feedback loop 44 is connected to a standby state control line 44a from the microcontroller 90. All of these circuit components are all known in the art, the scope of the invention is not intended to be limited to any particular type thereof, and a person skilled in the art would appreciate how they cooperate to provide a main power supply. The function of the main power supply 40 will be explained in more detail below and further in relation to the description of FIGS. 2–6 below.

In operation, the SMPS controller 41 controls energy supplied to primary winding 42a of the transformer 42, by switch 43, which is preferably a Field Effect Transistor (FET). The SMPS controller 41, can control, for instance, switching frequency and/or duty cycle. Feedback along line 44, from the secondary side of the transformer 42, is fed to the SMPS controller 41, in order to keep rectified secondary voltages V1, V2, V3 stable. The display monitor circuits 60, . . . , 95 are all fed by the power supply.

Regarding the isolated/non-isolated interface, all parts in a given high wattage device which have calvanic connection to parts which the user can touch must be isolated from the mains voltage. Such isolation is realized with the transformer 42, having adequate isolation between primary and secondary windings. The feedback signal 44 is fed from the secondary to primary winding via isolator 45, which may be an opto-isolator.

There are disadvantages to the basic display monitor power supply circuit 100 shown in FIG. 1, which result primarily from the separate PFC circuitry 30. The inductor 32 is large, heavy and expensive. The switch 36 must be a powerful switch, and the controller circuit 31 is also needed.

The present invention provides a solution to the aforementioned problems in the industry and also fulfills the aforementioned needs in the industry.

SUMMARY OF INVENTION

In particular, the present invention provides a power supply circuit for powering a user interface device such as a display monitor, which includes a switching mode power supply (SMPS) circuit and a voltage phase information (VPI) combiner circuit.

In operation, the SMPS circuit responds to a mains voltage signal (i.e. mains input) and also to a voltage phase information combiner signal (VFB) from the voltage phase information combiner circuit, for providing three different signals. The voltage phase information combiner signal (VFB) contains information about a phase relationship between a current drawn by the SMPS circuit and a voltage of the mains voltage signal.

The first two signals are provided back to the voltage phase information combiner circuit, and include a voltage phase information signal (VPI) containing information about a voltage phase of the mains voltage signal, as well as a voltage feedback signal containing information about the voltage of the switching mode power supply signal for powering the monitor. The third signal is the switching mode power supply signal for powering the monitor.

The voltage phase information combiner circuit responds to the voltage phase information signal (VPI) and the voltage feedback signal, for providing the voltage phase information combiner signal (VFB) to a controller of the SMPS circuit for shaping the current drawn by the SMPS circuit to substantially follow the phase of the mains voltage signal.

The voltage phase information combiner circuit may be in the form of a voltage modulated system or a frequency modulated system.

In the voltage modulated system, the voltage phase information combiner has a voltage phase information combiner having a differential amplifier that adds the voltage phase information signal (VPI) and the voltage feedback signal, for providing the voltage phase information combiner signal (VFB) to the controller of the SMPS circuit.

In the frequency modulated system, the voltage phase information combiner has a voltage phase information generator and a voltage phase information oscillator combiner. The voltage phase information generator may include a synchronization circuit, an oscillator and a full wave rectifier.

The power supply circuit has a capacitor Cm arranged between the rectifier and an input of the main power supply of the SMPS circuit. The capacitor Cm has a low capacitance that does not store energy to decrease the rectified mains voltage frequency ripple, but only filters or suppresses a switching frequency of the SMPS circuit.

The whole thrust of the present invention is to get rid of the inductor or inductance which is used in the prior art only for the purposes of power factor correction and to share the primary winding of the SMPS circuit and controller for Power Factor Control to shape the current drawn by SMPS circuit to follow mains voltage phase.

Moreover, the present invention (1) provides a economical solution where additional control circuitry for the power factor correction circuit is minimized by sharing an existent display controller for the power factor correction; and (2) makes the power factor correction circuit controllable according to power consuming of the display monitor.

Other advantages of the present invention include the fact that the mains input voltage can be universal (i.e. 90 to 264 VAC), and the power factor correction function is an active type and can be controller by the microcontroller, and can include other functions like a soft start of the SMPS and a switching off the power factor correction during the power save state.

BRIEF DESCRIPTION OF THE DRAWING

FIGS. 1A and 1B, is a circuit diagram of a basic display monitor power supply circuit that is known in the prior art.

FIG. 2B is a block diagram of a voltage modulated system that is the subject matter of the present invention.

FIG. 2C is a block diagram of a frequency modulated system that is the subject matter of the present invention.

FIG. 3A, including FIGS. 3A-1 and 3A-2, is a circuit diagram of one embodiment of the voltage modulated system shown in FIG. 2A.

FIGS. 3B-1 and 3B-2, is a more detailed circuit diagram of the voltage modulated system shown in FIG. 3A.

DETAILED DESCRIPTION OF INVENTION

Figure 1B:
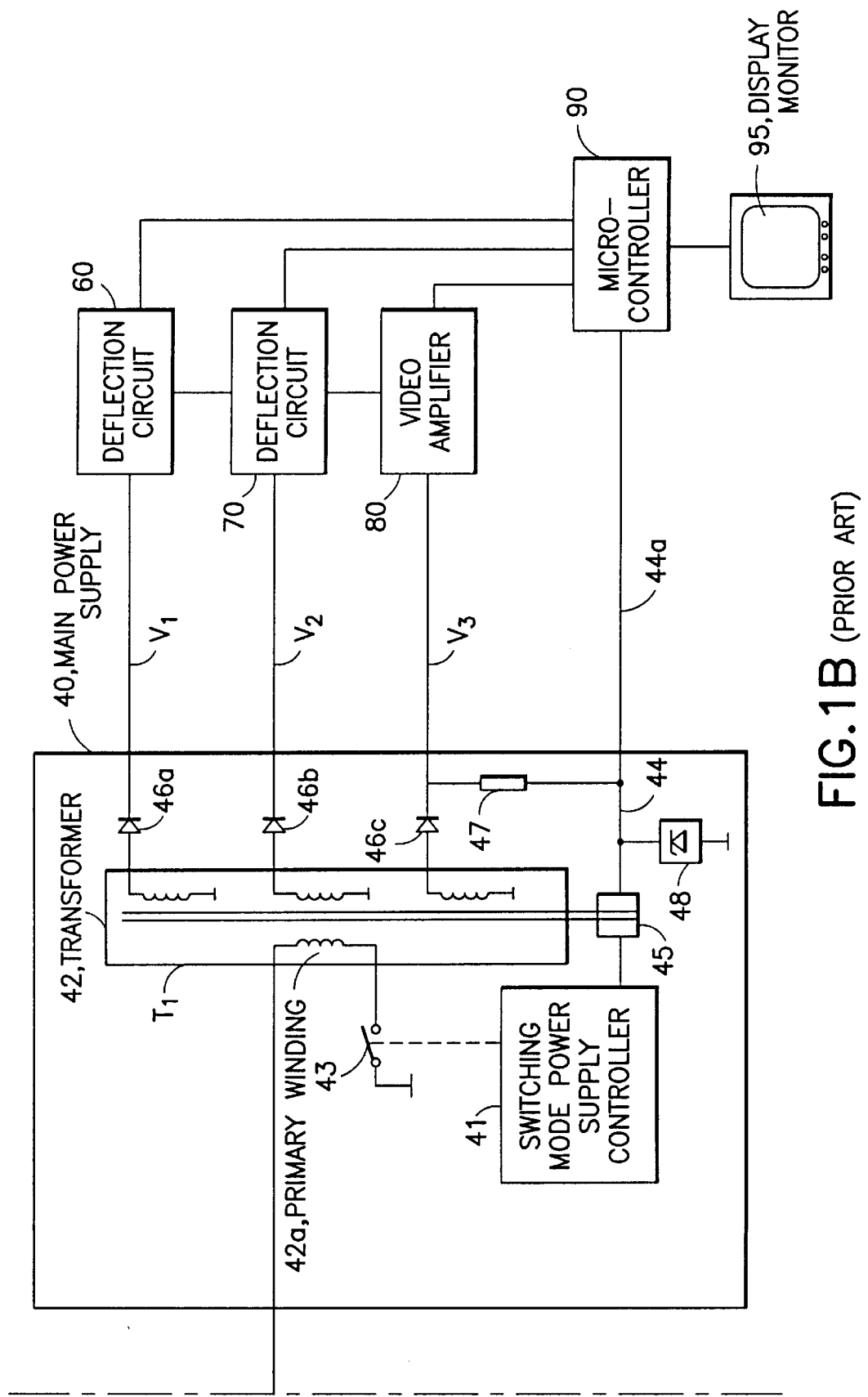
Figure 2A:
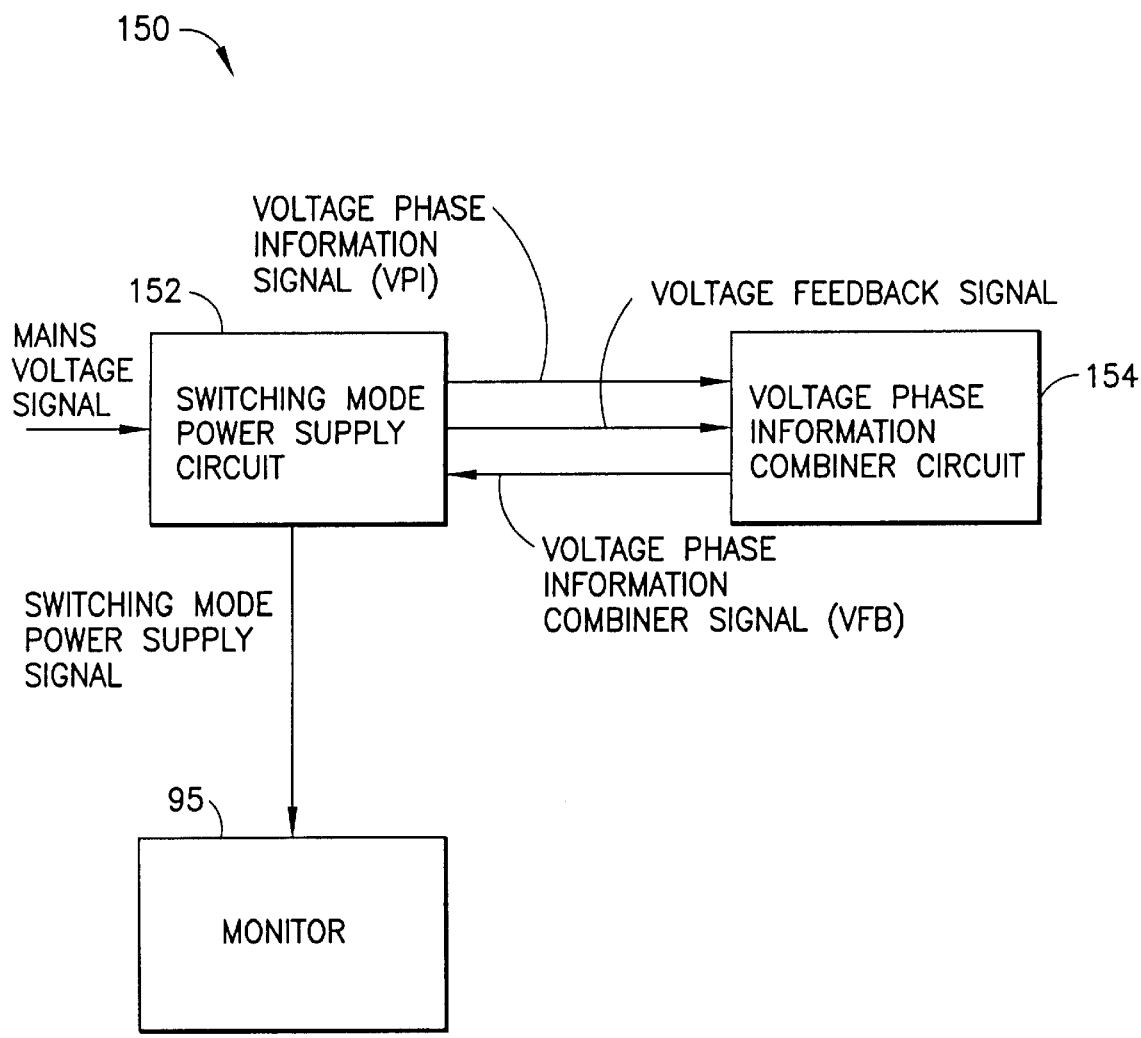
FIG. 2A is a block diagram of a power supply circuit that is the subject matter of the present invention.

FIGS. 2A, 2B, 2C: The Basic Invention

FIG. 2A shows a power supply circuit generally indicated as 150 for powering a display monitor 95. The power supply circuit 150 includes a switching mode power supply (SMPS) circuit 152 and a voltage phase information combiner circuit 154, which are discussed in greater detail in relation to FIGS. 3A, 3B and 6.

In operation, the SMPS circuit 152 responds to a mains voltage signal (i.e. mains input) and to a voltage phase information combiner signal (VFB) from the voltage phase information combiner circuit 154, for providing three different signals. The voltage phase information combiner signal (VFB) contains information about a phase relationship between a current drawn by the SMPS circuit 152 and a voltage of the mains voltage signal.

The first two signals are provided back to the voltage phase information combiner circuit 154, and include a voltage phase information signal (VPI) containing information about a voltage phase of the mains voltage signal, as well as a voltage feedback signal containing information about the voltage of the switching mode power supply signal.

The third signal is a switching mode power supply signal for powering the monitor 95.

The voltage phase information combiner circuit 154 responds to the voltage phase information signal (VPI) and the voltage feedback signal, for providing the voltage phase information combiner signal (VFB) to a controller 41 (FIGS. 1 and 3A, 3B, 6) of the SMPS circuit 152 for shaping the current drawn by the SMPS circuit 152 to substantially follow the phase of the mains voltage signal.

FIG. 2B shows a block diagram of one embodiment of the basic invention shown in FIG. 2A in the form of a voltage modulated system generally indicated as 160. The voltage modulated system 160 is shown and described in greater detail in relation to FIGS. 3A and 3B below.

Figures 2, 3A:
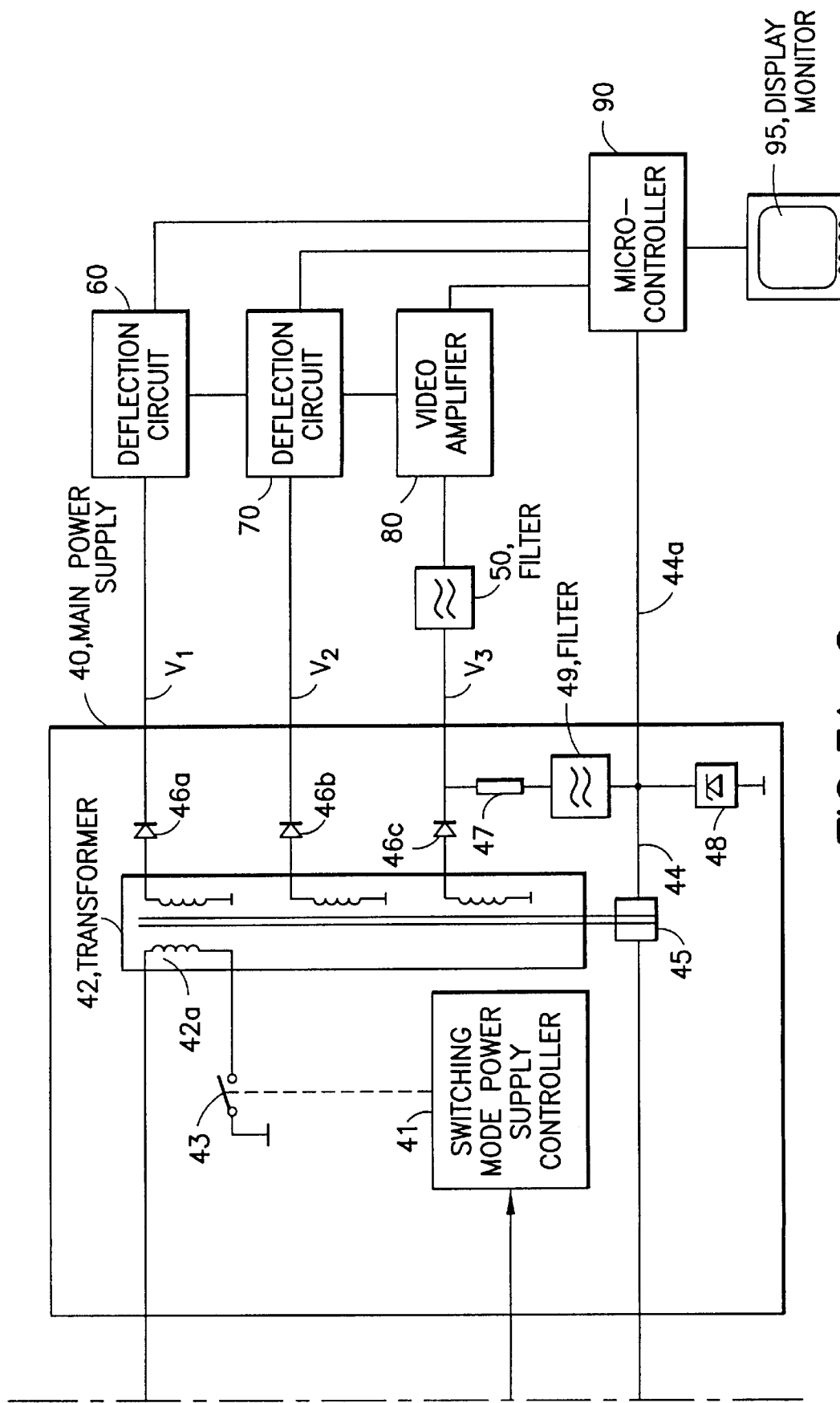
Figures 1, 3B:
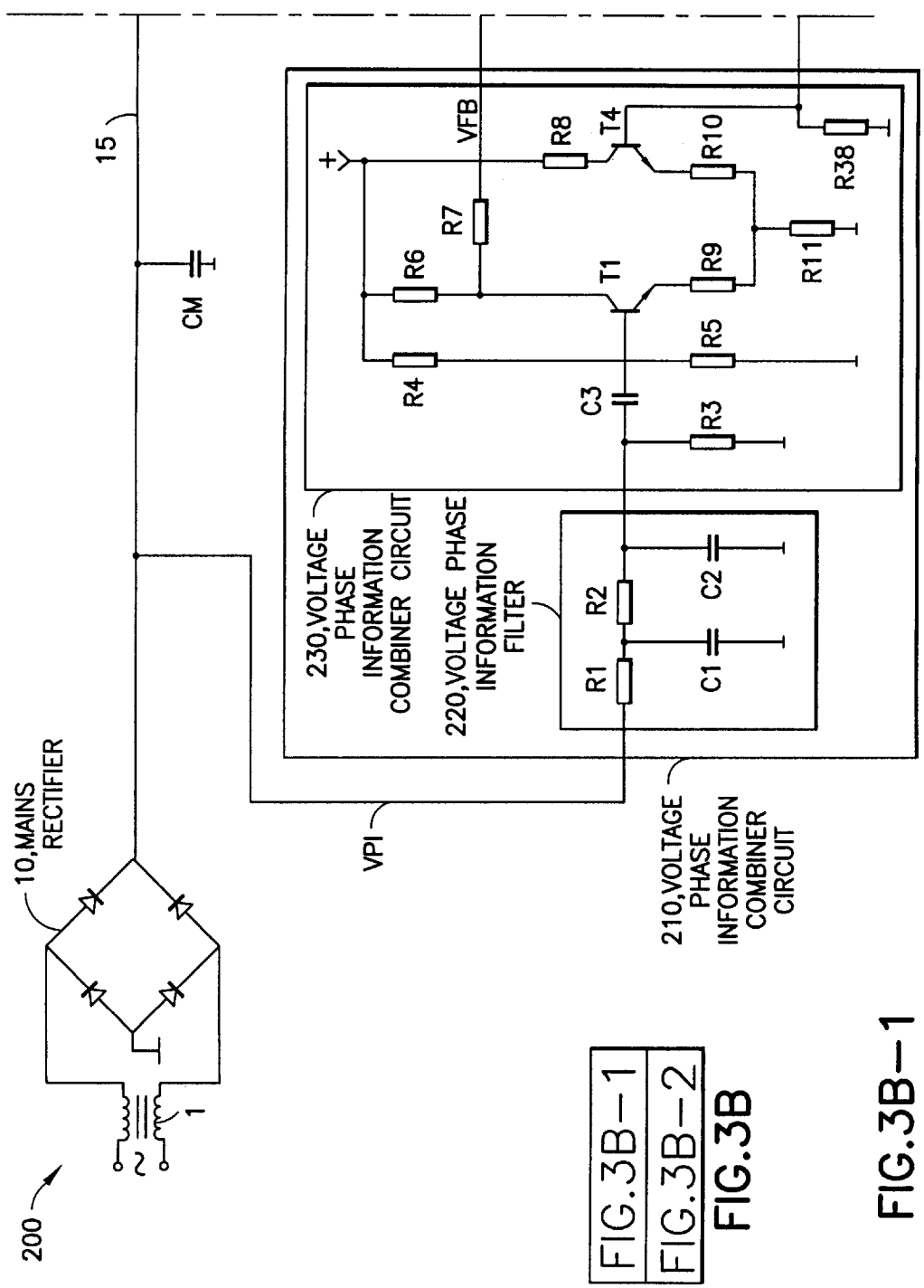
FIG. 1, including
FIG. 3B, including
Figures 2, 3B:
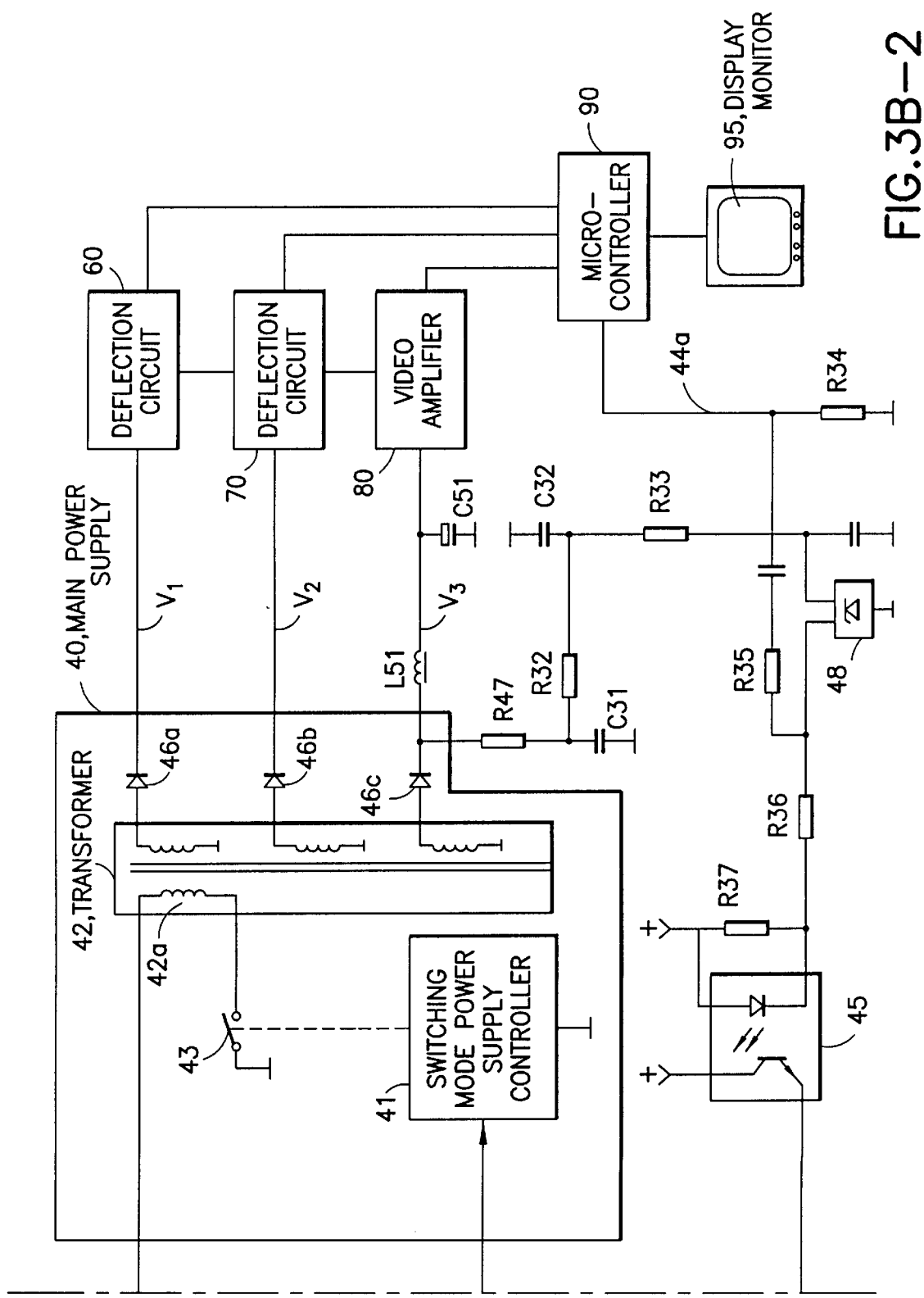

The voltage modulated system 160 includes the SMPS circuit 152 having an input connector and input filter shown as reference numeral 1 in FIG. 1, a rectifier and filter shown as reference numeral 10 in FIG. 1, a controller, driver unit shown as reference numerals 41, 43 in FIG. 1, and a transformer, power stage and output filters shown as reference numerals 40, 60, 70, 80 in FIG. 1.

The voltage modulated system 160 includes the voltage phase information combiner circuit 154 which responds to phase (VPI) and feedback signals, for providing the voltage feedback signal (VFB) to a controller 41 (FIGS. 1, 3A, 3B and 6) of the controller, driver unit 41, 43.

FIG. 2C shows a block diagram of another embodiment of the basic invention shown in FIG. 2A in the form of a voltage modulated system generally indicated as 170. The voltage modulated system 170 is shown and described in greater detail in relation to FIG. 6 below.

The voltage modulated system 170 includes the SMPS circuit 152 having an input connector and input filter shown as reference numeral 1 in FIG. 1, a rectifier and filter shown as reference numeral 10 in FIG. 1, a controller, driver unit shown as reference numerals 41, 43 in FIG. 1, and a transformer, power stage and output filters shown as reference numerals 40, 60, 70, 80 in FIG. 1.

The voltage modulated system 170 includes the voltage phase information combiner circuit 154 in the form of an oscillator circuit and generally indicated as OSC. The oscillator circuit OSC responds to phase (VPI) and feedback signals, for providing the voltage feedback signal (VFB) to the controller 41 (FIGS. 1, 3A, 3B, 6) the controller, driver unit 41, 43. In FIG. 2C, the oscillator circuit OSC is shown as an addition to the controller, driver unit 41, 43 in FIG. 1. The scope of the invention is not intended to be limited to whether the oscillator circuit OSC is considered a separate element of the overall power supply circuit in FIG. 2A or as an added part to the controller, driver unit 41, 43 in FIG. 1.

FIG. 3A: A Frequency Modulated System

FIG. 3A, including FIGS. 3A-1 and 3A-2, shows one embodiment of a power supply circuit generally indicated as 200 for powering the monitor 95. Similar elements in FIGS. 1 and 3A are labelled with similar reference numerals.

In FIG. 3A-1, the power supply circuit 200 has a voltage phase information combiner circuit 154, 210 having a VPI filter 220 and a VPI combiner 230. (In relation to the block diagram in FIG. 2A, the SMPS circuit 152 (FIG. 2A) would include circuit elements outside the box designating the voltage phase information combiner circuit 154, 210 in FIG. 3A-1).

The VPI filter 220 selects only a mains voltage component from a rectified full wave mains voltage signal (VPI) from the mains rectifier 10. The VPI filter 220 filters out other frequency components like the SMPS switching frequency ripple, which would be provided along line 15 to the SMPS 40. The VPI filter 220 is a low pass filter having a cut off frequency slightly higher than the rectified mains voltage frequency, typically in a range of 200 to 300 Hertz.

The VPI adder/combiner 230 receives a filtered rectified full wave mains voltage signal VPI from the mains rectifier 10 output. The VPI combiner 230 is provided into a feedback loop that includes the feedback resistor 47, the filter 49, the feedback line 44 and the isolator 45 between an output voltage V3 (which can be any of output voltages V1–V3) and feedback input VFB of the controller 41 of the SMPS circuit 152 to control the phase of current drawn by the power supply 40 (See FIG. 3A-2.). In effect, the VPI adder/combiner 230 receives the filtered rectified mains voltage signal, scales it, and adds it to a feedback voltage signal to provide the voltage feedback signal (VFB) to the controller 41 of the SMPS circuit 152. The feedback voltage signal is a DC-voltage. The term adder or combiner can be used for the VPI combiner 230, as well as a mixer or modulator. The VPI combiner 230 can be any circuitry that combines at least two signals together and produces an output signal that depends on the input signals.

Figure 4A:
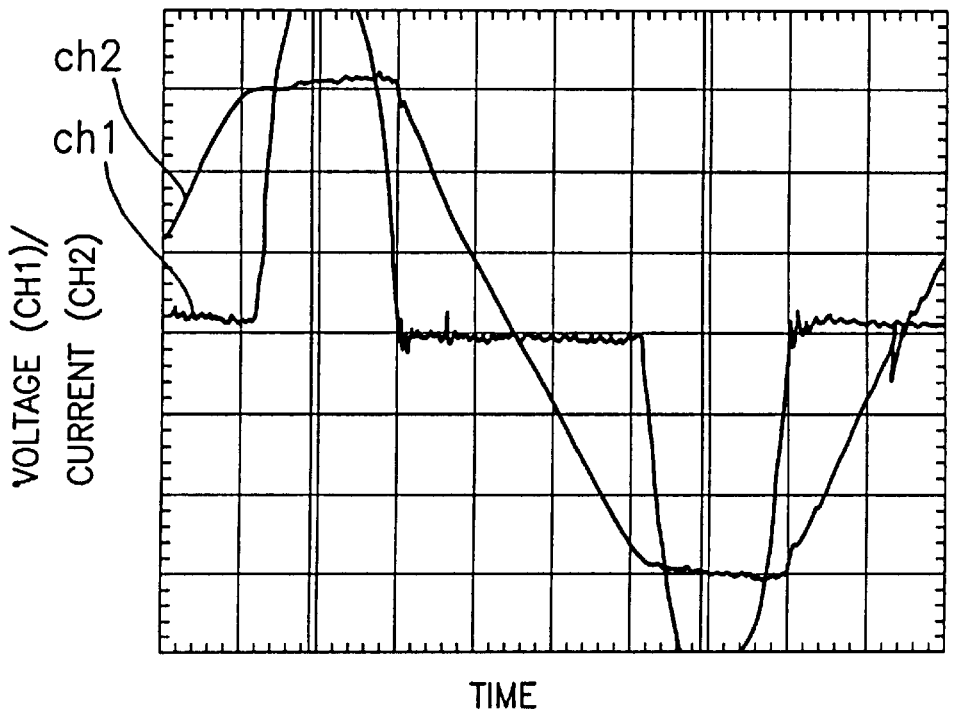
FIG. 4A is a graph of voltage (ch1) in relation to time, and a graph of current (ch2) in relation to time measured from a SMPS circuit without power factor correction measured from a display monitor power supply.
Figure 4B:
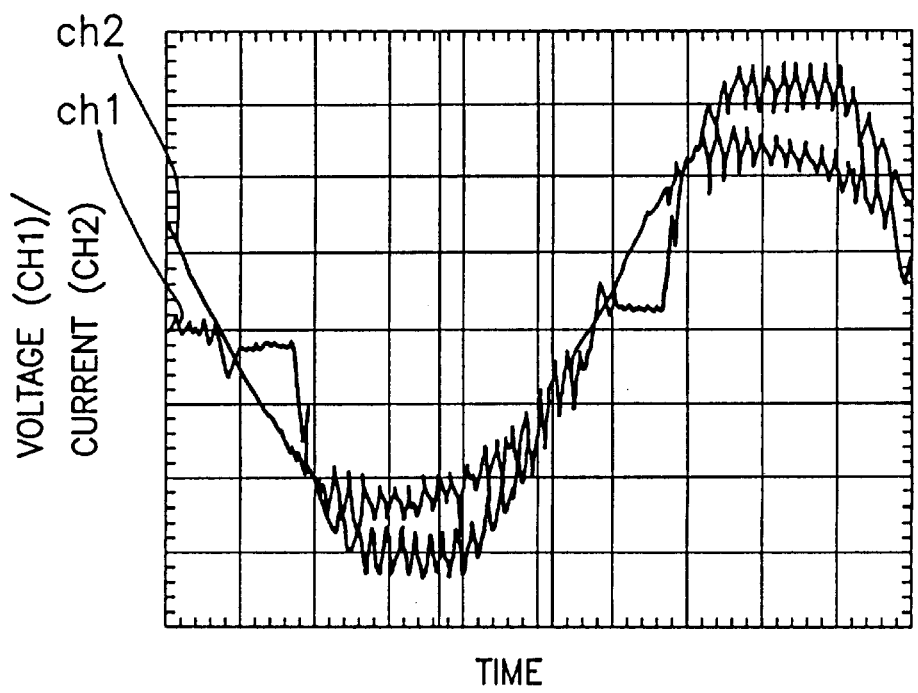
FIG. 4B is a graph of voltage (ch1) in relation to time, and a graph of current (ch2) in relation to time measured from the circuit shown in FIG. 3A.

In operation, FIGS. 4*a*, 4*b* show the effect of adding a voltage proportional to the rectified mains voltage.

FIG. 4*a* shows typical voltage and current drawn by SMPS circuit 152 without a Power Factor Correction measured from display monitor power supply. The function ch1 is a mains voltage signal and the function ch2 is the current signal. The optimum power Factor is 1 (current and voltage exactly in the same phase). The power Factor in FIG. 4*a* is approximately 0.6–0.7.

FIG. 4*b* is a measurement result from embodiment in FIG. 3B. The power Factor is 0.98–0.99.

It is evident to solve Power Factor as in prior to add PFC circuitry between the Power Supply and mains input to adjust the phase of the current.

In FIG. 4*a*, the current drawn without a phase correction is shown as the function ch1 which has a high narrow pulse. FIG. 4*b* shows the effect of adding the mains voltage phase information to the input of the SMPS controller 41, which spreads and decreases the SMPS input current pulse shown as the function ch1 causing it to substantially follow the phase of SMPS input voltage.

In FIGS. 4*a*, 4*b*, the scale for the mains voltage (ch2) is 50V per division. Current is measured as a voltage over a one Ohm serial resistor in the mains input. The scale for voltage over the resistor indicating current (ch1) has a 200 millivolt per division, or when converted to current is 0.2 amperes per division (0.2 Volts divided by 1 Ohm). FIGS. 4*a*, 4*b* are shown by way of example only; the scope of the invention is not intended to be limited to the measured voltage or current shown in the graphs in FIGS. 4*a*, 4*b*.

The aim of the SMPS feedback loop is to monitor the output voltages V1–V3 of the main power supply 40 of the SMPS circuit 152 and feed correction voltage to the VFB input of the controller 41 of the SMPS circuit 152. The correction effects the SMPS controller 41 if output voltages are drifting, for instance, because of change in the mains voltage caused by a SMPS load or a temperature drift in the power supply circuitry.

By adding mains voltage phase information to the feedback input VFB of the controller 41 of the SMPS circuit 152, the feedback signal does not only provide a proportional control related to the output voltages V1–V3 of SMPS. The added VPI signal to the feedback signal improves the power factor effects of the output voltages of SMPS circuit 152, because it adds to the feedback loop information which is not present in the output voltages V1–V3 of the SMPS circuit 152. Basically, the VPI signal which is added to feedback loop changes the output voltages of the SMPS circuit 152 depending on voltage disturbance, which may include an AC (alternating-current voltage) component on DC (direct-current voltage).

In the power supply circuit 200, a filter 49 is added to the feedback loop to prevent feeding back the disturbance voltage which would, if fed back to SMPS controller, cancel the Power Factor Correction effect. The filter 49 feeds through DC which is RMS (Root Mean Square) value of disturbed output voltage (DC+AC).

In the power supply circuit 200, a suitable filter 50 or regulator is added to filter out voltages depending on the need of the output voltage V1–V3. For instance, a general purpose linear regulator can remove ripples caused by Power Factor Correction. A suitable filter is, for instance, a LC low pass filter dimensioned to cut off disturbance caused by the Power Factor Correction.

The Capacitor (Cm)

The capacitor Cm corresponds to the capacitor C34 in the prior art shown in FIG. 1. However, the SMPS circuit 152 in the prior art in FIG. 1 uses capacitors having a high capacitance in rectified mains, like 220 to 470 microfarads (uF) to decrease rectified mains voltage ripple (100 . . . 120 Hz) supplied to an input of the main power supply 40 of the SMPS circuit 152. One disadvantage of such a design is that high voltage high capacitance capacitors are big and expensive.

In the power supply circuit 200 in FIG. 3A, a capacitor Cm having a low capacitance is used. The capacitor Cm does not store energy to decrease the rectified mains voltage frequency ripple, but only filters or suppresses the switching frequency of the SMPS circuit 152. This has an advantage whereby the capacitance can be decreased down to approximately 1:1000, typically to 0.1 to 1.5 uF. Further, this design has the advantage that the capacitor Cm does not substantially effect rectified mains voltage phase, and phase information can be picked directly from the input of the power supply 40 to adder 30.

Figure 5A:
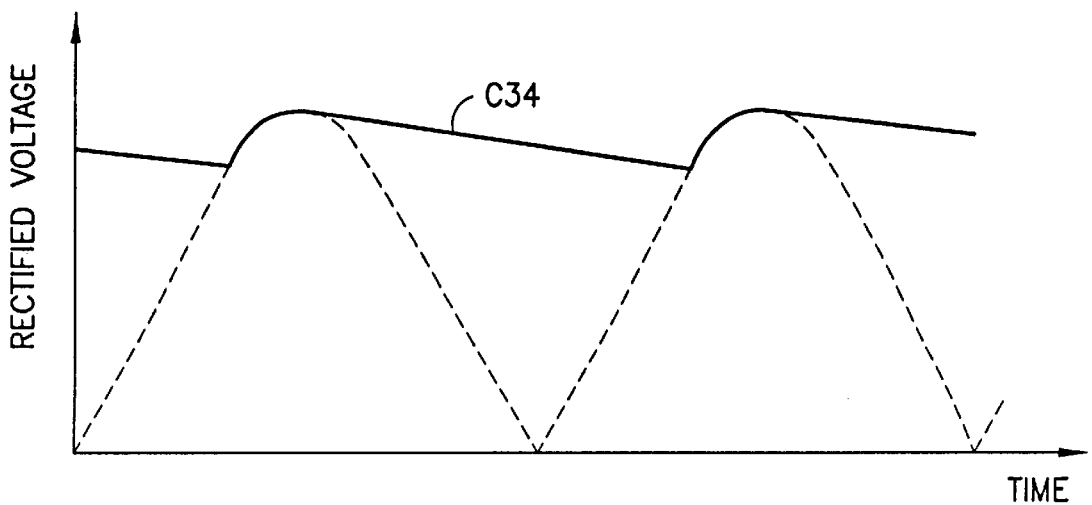
FIG. 5A is a diagram of a graph of a rectified mains voltage in relation to time measured at a high energy storage capacitor C34 shown in FIG. 1.

FIG. 5a shows the rectified mains voltage with a high energy storage capacitor C34 in rectifier output, mains voltage phase information is lost.

Figure 5B:
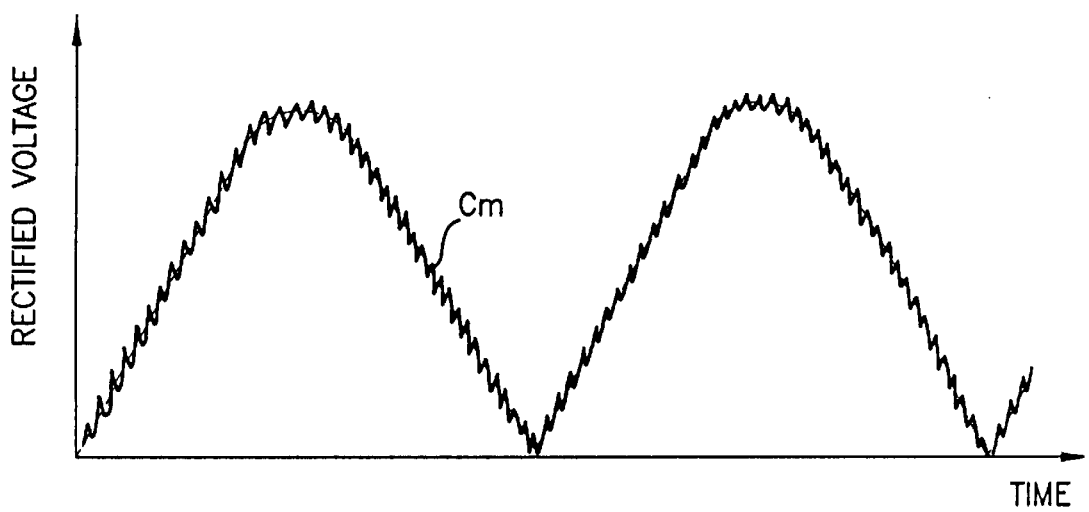
FIG. 5B is a diagram of a graph of a rectified mains voltage in relation to time measured at a low energy storage capacitor Cm shown in FIGS. 3A and 3B.

FIG. 5b shows the rectified mains voltage with a low energy storage capacitor Cm. Mains voltage phase information is remaining, carrying only high SMPS switching frequency ripple.

FIG. 3B, including FIGS. 3B-1 and 3B-2

FIG. 3B shows a more detailed diagram of the power supply circuit 200 shown in FIG. 3A. Similar elements in FIGS. 1, 3A and 3B are labelled with similar reference numerals.

As shown, in FIG. 3B-1, the VPI filter 220 from the output of the rectifier 10 includes circuit components R1, C1, R2 and C2. This VPI filter 220 selects a rectified mains voltage wave-form signal from VPI and filters out other frequency components like the switching frequency of the SMPS circuit 152, seen as a higher frequency component in FIG. 5b on the mains waveform signal. The resistor R3 scales the voltage level of the filtered VPI signal suitable for the VPI combiner 230.

The VPI combiner 230 includes transistors T1, T4 arranged in the form of a differential amplifier which is a configuration known to a person skilled in the art. The capacitor C3 is a DC-blocking capacitor, and resistors R4 and R5 comprise a DC-biasing for the differential stage. The VPI signal is fed to the base of the transistor T1, and the feedback signal from the output voltage V3 of the SMPS circuit 152 is fed via the feedback loop to base of a transistor T4. The transistors T1, T4 have a common emitter resistor R11 which effects the differential stage so that both input signals are added together. Resistors R6, R8, R9, R10 are used to adjust feedback loop gain and relationship of summed signals.

In FIG. 3B-2, feedback information from the output voltages of the SMPS circuit 152 is fed from the secondary side output voltage V3 to the base of the transistor T4. Resistors R47, R32 and capacitors C31, C32 perform a filter that filters RMS-value from voltage V3. Resistors R33 and R34 perform voltage level scaling. The control line 44a from the microcontroller 90 can control output voltage levels and/or standby state of SMPS. A reference voltage component 48 provides a reference voltage. The optoisolator 45 provides electrical isolation between the primary side and the secondary side of SMPS in the feedback loop. In FIGS. 3A, 3B, the transformer 42 has isolation between primary and secondary windings. Embodiments are also envisioned in which the secondary winding for feedback can also be on a non-isolated side of the transformer 42.

Figures 6, 6A, 6B:
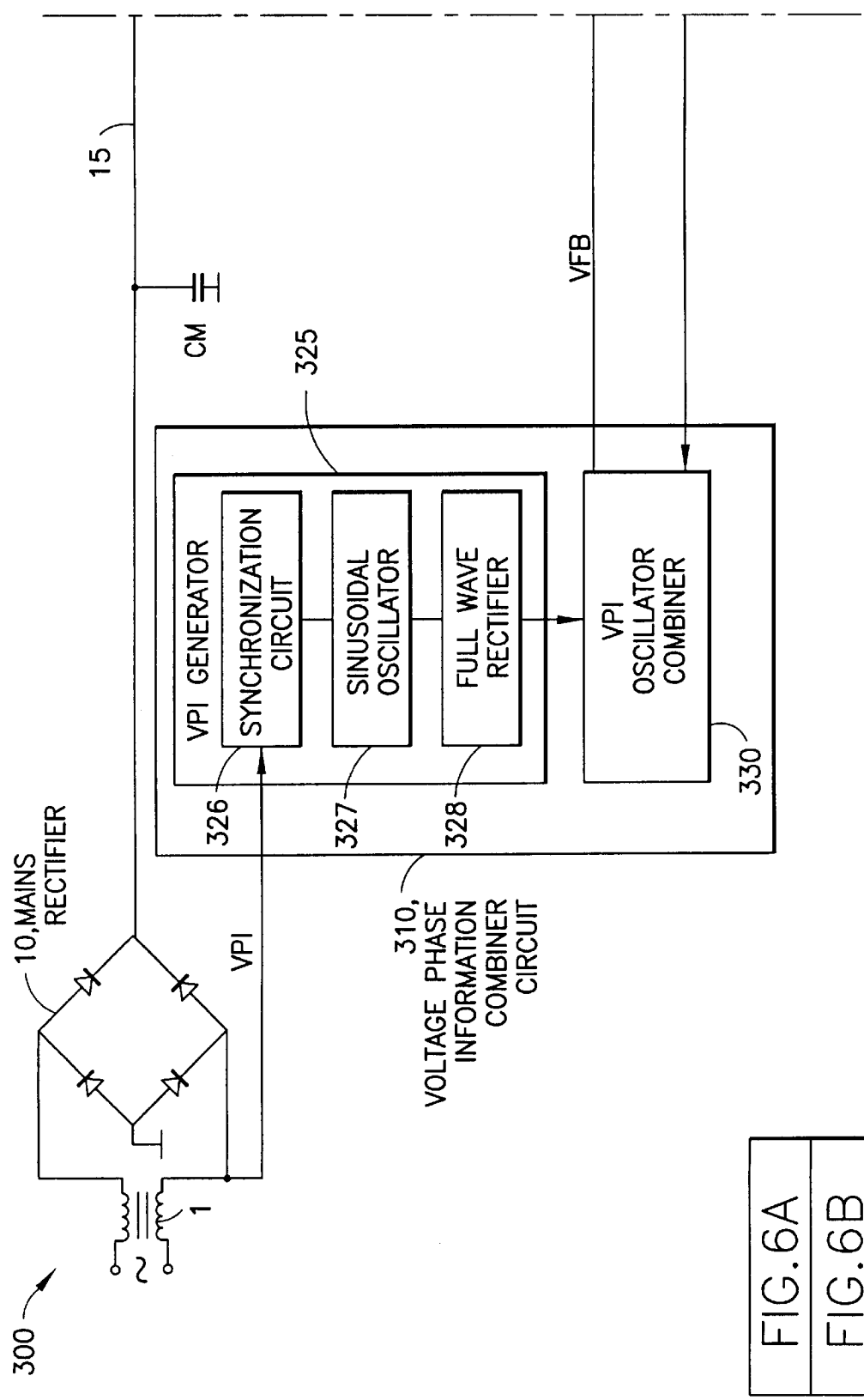
FIG. 6, including
FIGS. 6A and 6B, is a circuit diagram of one embodiment of the frequency modulated system shown in FIG. 2B.
Figure 6B:
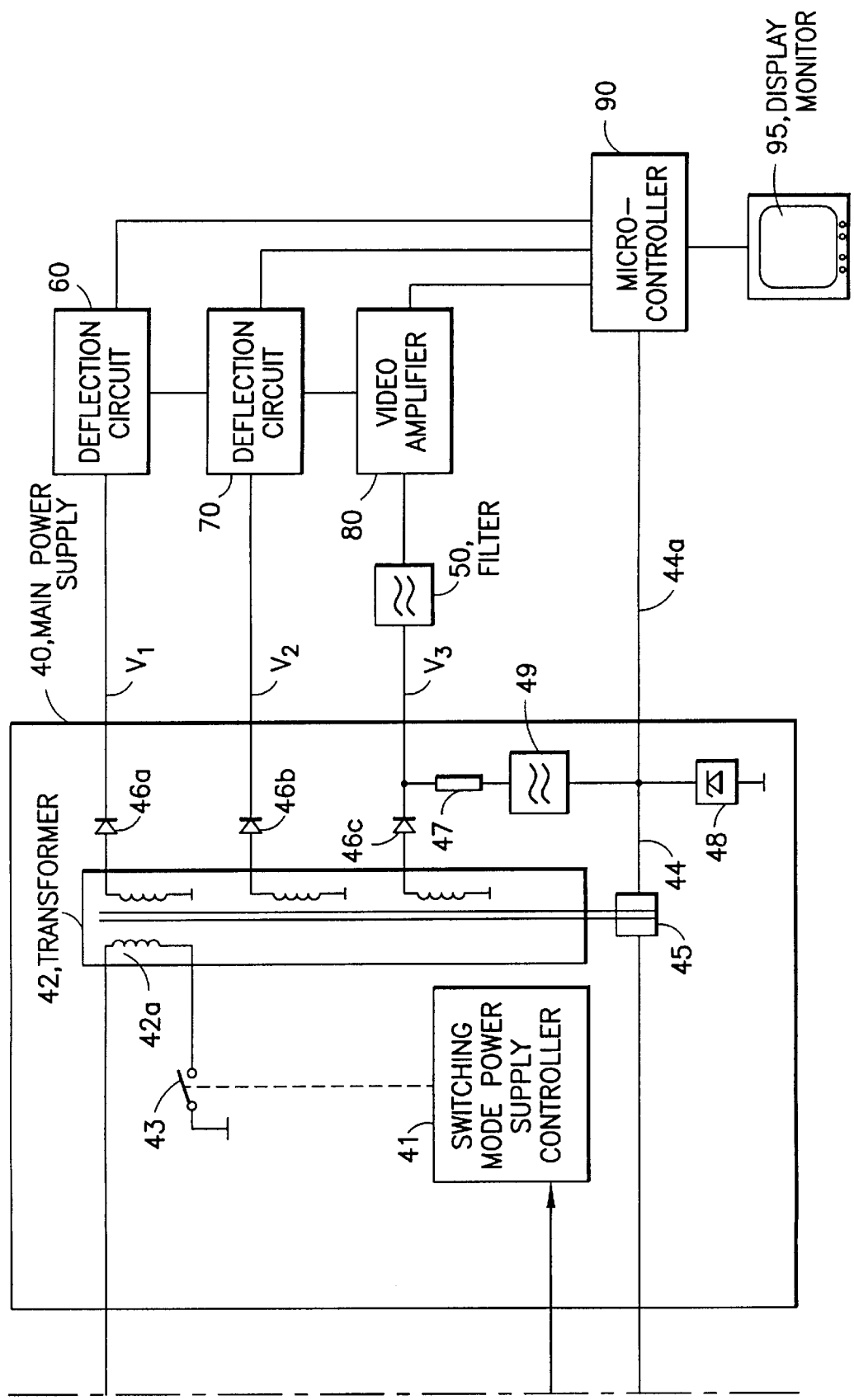

FIG. 6: A Frequency Modulated System

FIG. 6, including FIGS. 6A and 6B, shows another embodiment of a power supply circuit generally indicated as 300 for powering the monitor 95. Similar elements in FIGS. 1, 3A, 3B and 6 are labelled with similar reference numerals.

The power supply circuit 300 has a voltage phase information combiner circuit 154, 310 having a VPI generator 325 and a VPI oscillator combiner 330. (In relation to the block diagram shown in FIG. 2A, the SMPS circuit 152 (FIG. 2A) would include circuit elements outside the box designating the voltage phase information combiner circuit 154, 310 in FIG. 3A.)

In FIG. 6, instead of using the rectified mains voltage signal from the output of the rectifier 10, it is also possible to use a separate oscillator 325 to generate a voltage phase proportional signal. As shown, the VPI generator 325 comprises a sinusoidal oscillator 327 and a synchronization circuit 326 that receives information about the mains voltage signal. The synchronization circuit 326 locks the phase of the oscillator 327 to the phase of the mains voltage signal. A full wave rectifier 328 rectifies the signal from the oscillator 327.

Moreover, embodiments are envisioned wherein the power supply circuit 300 includes a filter to select only fundamental frequency component of a rectified oscillator signal, which can be used between the VPI generator 325 and the oscillator combiner 330.

The Scope of the Invention

The scope of the invention is not intended to be limited to any particular type of SMPS controller circuits 41. There are many different SMPS controller circuits 41 known in the art. When describing the feedback loop, it is understood to be circuitry from the output voltage V1–V3 of the SMPS circuit 152 to SMPS switch 43. The controller 41 of the SMPS circuit 152 may be considered part of the feedback loop from output voltage to the SMPS switch 43. The invention is not intended to be limited to any special type of SMPS controller 41 or number of switches 43. Also, embodiments are envisioned wherein the PFC controller 31 from FIG. 1 can be adapted to control the feedback loop.

Connecting of the feedback loop from output voltages V1–V3 to the SMPS controller 41 is not limited to any special input (VFB) of the controller circuit. It can be any connection point in SMPS controller which effects the SMPS switch 43 in a way to shape current drawn by the SMPS circuit 152 to substantially follow the mains voltage phase. For instance, connecting mains voltage phase information to the reference voltage input of the SMPS controller 41 effects the SMPS switch 43 control. The SMPS controller 41 may also be considered part of the combining component, one input receiving VPI signal and another receiving feedback from SMPS output voltages.

Combining mains VPI signal and the feedback signal is not limited to any portion of the feedback loop.

The mains voltage VPI signal may be added to the feedback loop also by controlling the current of the isolator 45 with the mains voltage phase information.

The VPI signal may also be fed to the isolated, secondary side of the SMPS circuit 152. Isolation may be realized by high value resistor (Mega ohms) which may be, for instance, part of the VPI filter (R1, R2), and phase information is added to the feedback loop portion 44 between the filter 49 and the isolator 45. The phase information can also be fed also to the reference voltage of circuit element 48.

Isolated phase information may also be fed to the microcontroller 90.

The microcontroller 90 receives phase information VPI and converts it to digital form and processes a received signal by digital signal processing. As known from the art, it is possible to control phase, amplitude and wave-form of a signal by digital signal processing.

After digitally processing the phase information, the signal is converted back to an analog signal and combined with the feedback signal.

This has an advantage in that the SMPS input current/voltage phase relationship can be controlled and fine tuned by the program of the microcontroller 90.

The microcontroller may also comprise a synchronization circuit like a Phase Locked Loop (PLL) and an oscillator to produce a phase correction signal. The isolated and scaled VPI signal from the mains voltage is fed to the PLL which is locked to the phase of the mains voltage and controls the oscillator. The oscillator signal may be converted to a digital form, processed by digital signal processing, converted to analog form, and combined to the SMPS feedback signal as discussed above.

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

We claim:

1. A power supply circuit (150, 160, 170, 200, 300) for powering a display monitor (95), comprising:

a switching mode power supply circuit (152), responsive to a mains voltage signal, and further responsive to a voltage phase information combiner signal (VFB) containing information about a phase relationship between a current drawn by the switching mode power supply circuit (152) and a voltage of the mains voltage signal, for providing a voltage phase information signal (VPI) containing information about a voltage phase of the mains voltage signal, for providing a switching mode power supply signal for powering the display monitor (95), and for providing a voltage feedback signal containing information about the voltage of the switching mode power supply signal; and a voltage phase information combiner circuit (154, 210, 310), responsive to the voltage phase information signal (VPI), and further responsive to the voltage feedback signal, for providing the voltage phase information combiner signal (VFB) to the switching mode power supply circuit for shaping the current drawn by the switching mode power supply circuit (152) to substantially follow the phase of the mains voltage signal.

2. A power supply circuit (150, 160, 170, 200, 300) according to claim 1, characterized in that the voltage phase information combiner circuit (154, 210, 310) combines the voltage phase information signal and the voltage feedback signal and provides the voltage phase information combiner signal (VFB) which depends on the voltage phase information signal and the voltage feedback signal.

3. A power supply circuit (150, 160, 170, 200, 300) according to claim 1, characterized in that the voltage phase information combiner circuit (154, 210, 310) includes an adder/combiner (210) having a differential amplifier that responds to the voltage phase information signal and the voltage feedback signal, for providing the voltage phase information combiner signal (VFB) to the switching mode power supply.

4. A power supply circuit (150, 160, 170, 200, 300) according to claim 1, characterized in that the voltage phase information combiner circuit (154, 210, 310) includes a filter (220) for selecting a rectified mains voltage wave-form from the voltage phase information signal and filtering out other frequency components, including a switching mode power supply switching frequency.

5. A power supply circuit (150, 160, 170, 200, 300) according to claim 4, characterized in that the filter (220) is a low pass filter having a cutoff frequency slightly higher than a frequency of the rectified mains voltage waveform, typically in a range of 200–300 Hertz.

6. A power supply circuit (150, 160, 170, 200, 300) according to claim 1, characterized in that the switching mode power supply circuit (152) includes a mains filter (1) and a rectifier (10), responsive to the mains voltage signal, for providing a filter rectified mains voltage signal that is supplied to the voltage phase information combiner circuit as the voltage phase information signal (VPI).

7. A power supply circuit (150, 160, 170, 200, 300) according to claim 1, characterized in that the switching mode power supply circuit (152) includes a feedback loop (44, 45, 47, 49) that supplies the voltage feedback signal.

8. A power supply circuit (150, 160, 170, 200, 300) according to claim 7, characterized in that the feedback loop (44, 45, 47, 49) includes an optoisolator (45) that isolates primary and secondary sides of the switching mode power supply circuit.

9. A power supply circuit (150, 160, 170, 200, 300) according to claim 1, characterized in that the switching mode power supply circuit (152) includes a main power supply (40) having a switching mode power supply controller (41) that responds to the voltage phase information combiner signal (VFB) for shaping the current drawn by the switching mode power supply circuit (152) to substantially follow the phase of the mains voltage signal.

10. A power supply circuit (150, 160, 170, 200, 300) according to claim 1, characterized in that the switching mode power supply (152) includes a capacitor (Cm) for suppressing a switching frequency ripple of the switching mode power supply circuit (152).

11. A power supply circuit (150, 160, 170, 200, 300) according to claim 1, characterized in that the capacitor (Cm) has a capacitance in a range of 0.1 to 1.5 uF, which does not substantially effect the phase of the mains voltage signal.

12. A power supply circuit (150, 160, 170, 200, 300) according to claim 1, characterized in that the voltage phase information combiner circuit (154, 210, 310) includes a voltage phase information generator (325) and a voltage phase information oscillator combiner (330) that respond to the voltage phase information signal (VPI) and the voltage feedback signal, for providing the voltage phase information combiner signal (VFB) to the switching mode power supply circuit (152) in the form of a voltage phase proportional signal.

13. A power supply circuit (150, 160, 170, 200, 300) according to claim 12, characterized in that the voltage phase information generator (325) includes a synchronization circuit (326), a sinusoidal oscillator (327) and a full wave rectifier (328).

14. A power supply circuit (150, 160, 170, 200, 300) according to claim 12, characterized in that the voltage phase information generator (325) responds to the voltage phase information signal (VPI), for providing a voltage phase information generator signal containing information about the phase of the mains voltage signal.

15. A power supply circuit (150, 160, 170, 200, 300) according to claim 13, characterized in that the voltage phase information generator (326) responds to the voltage phase information signal (VPI) and locks the phase of the oscillator (327) to the phase of the mains voltage signal.

16. A power supply circuit (150, 160, 170, 200, 300) for powering a display monitor (95) comprising:
   a controlling means (41), responsive to a feedback signal (VFB), for controlling a switching frequency or a switching signal duty cycle;
   a rectifier (10), responsive to a mains voltage signal, for providing a rectified mains voltage signal;
   a transformer (42) having a primary winding and at least one secondary winding, the primary winding receiving a signal from the rectifier (10);
   an energy storage capacitor (Cm) connected to the primary winding to decrease a frequency ripple of the switching mode power supply;
   a switching means (43) connected to the primary winding to control energy fed to the primary winding;
   a feedback loop (46, 47, 45, 41, 43) for providing a feedback signal (44) from the at least one secondary winding to the primary winding;
   a voltage wave-form generating means (10, 325) to generate a voltage wave-form signal having a phase relationship substantially fixed to a phase of the mains voltage signal; and
   means (154, 210, 310) to combine the feedback signal (46, 47, 45, 41, 43) and the voltage wave-form signal, for providing the feedback signal (VFB) to the controlling means (41).

17. A power supply circuit (150, 160, 170, 200, 300) according to claim 16, characterized in that the power supply circuit further comprises a filter (49) for preventing feeding back a disturbance voltage to the controlling means (41) that would otherwise cancel an effect of a power factor correction.

18. A power supply circuit (150, 160, 170, 200, 300) according to claim 16, characterized in that the switching mode power supply further comprises a VPI filter (220) that filters out other frequency components including a switching frequency ripple.

19. A power supply circuit (150, 160, 170, 200, 300) according to claim 16, characterized in that the voltage wave-form generating means (10, 325) comprises a full wave rectifier (10).

20. A power supply circuit (150, 160, 170, 200, 300) according to claim 16, characterized in that the energy storage capacitor (Cm) has a capacity in a range that is high enough to supply the primary winding during the duty cycle of switching frequency and low enough not to substantially distort the rectified mains voltage signal.

21. A power supply circuit (150, 160, 170, 200, 300) according to claim 16, characterized in that the voltage wave-form generating means (10, 325) comprises a sinusoidal oscillator (325, 327) synchronized to the mains voltage signal.

22. A power supply circuit (150, 160, 170, 200, 300) according to claim 16, characterized in that the power supply circuit further comprises a microcontroller (90) to control the feedback loop (46, 47, 45, 41, 43).

23. A power supply circuit (150, 160, 170, 200, 300) according to claim 16, characterized in that the voltage wave-form generating means (10, 325) comprising a microcontroller controlled digital signal processing means (90).

24. A power supply circuit (150, 160, 170, 200, 300) according to claim 18, characterized in that the VPI filter (220) is a low pass filter having a cutoff frequency in a range of 200–300 Hertz.

25. A power supply circuit (150, 160, 170, 200, 300) according to claim 16, characterized in that the means (154, 210, 310) combines the feedback signal (44) and the voltage waveform signal and provides the voltage feedback signal (VFB) which depends on the feedback signal (44) and the voltage waveform signal.

26. A power supply circuit (150, 160, 170, 200, 300) according to claim 16, characterized in that the means (154, 210, 310) includes an adder/combiner (210) having a differential amplifier (T1, T4).

27. A power supply circuit (150, 160, 170, 200, 300) according to claim 16, characterized in that the means (154, 210, 310) includes an a VPI generator (325) and an oscillator combiner (330).

28. A power supply circuit (150, 160, 170, 200, 300) according to claim 16, characterized in that the VPI generator (325) includes a synchronization circuit (326), a sinusoidal oscillator (327) and a full wave rectifier (328).

29. A method for powering a display monitor (95), comprising the steps of:
   responding to a mains voltage signal and a voltage phase information combiner signal (VFB), for supplying a switching mode power supply signal from a switching mode power supply circuit (152) to the display monitor (95); and
   combining a voltage phase information signal (VPI) and a voltage feedback signal with a voltage phase information combiner circuit (154, 210, 310), for providing the voltage phase information combiner signal (VFB) for shaping a current drawn by the switching mode power supply circuit (152) to substantially follow a phase of the mains voltage signal.

30. A method according to claim 29, characterized in that the method includes the step of providing with the voltage phase information combiner signal (VFB) information about a phase relationship between the current drawn by the switching mode power supply circuit (152) and a voltage of the mains voltage signal.

31. A method according to claim 29, characterized in that the method includes the step of providing with the voltage phase information signal (VPI) information about a voltage phase of the mains voltage signal.

32. A method according to claim 29, characterized in that the method includes the step of providing with the voltage feedback signal information about a voltage of the switching mode power supply signal.

33. A method according to claim 29, characterized in that the method includes the steps of:
   providing with the voltage phase information combiner signal (VFB) information about a phase relationship between the current drawn by the switching mode power supply circuit (152) and a voltage of the mains voltage signal;
   providing with the voltage phase information signal (VPI) information about a voltage phase of the mains voltage signal; and
   providing with the voltage feedback signal information about a voltage of the switching mode power supply signal.

34. A power supply circuit having a switching mode power supply circuit for providing power to a display monitor, characterized in that the power supply circuit has a voltage phase information combiner circuit that responds to a voltage phase information signal (VPI) and a voltage feedback signal, for providing a voltage phase information combiner signal (VFB) to the switching mode power supply circuit for shaping a current drawn by the switching mode power supply circuit to substantially follow a phase of the mains voltage signal.

35. A power supply circuit according to claim 34, characterized in that the voltage phase information combiner circuit combines the voltage phase information signal and the voltage feedback signal and provides the voltage phase information combiner signal (VFB) which depends on the voltage phase information signal and the voltage feedback signal.

36. A power supply circuit according to claim 34, characterized in that the voltage phase information combiner circuit includes an adder/combiner (210) having a differential amplifier that responds to the voltage phase information signal and the voltage feedback signal, for providing the voltage phase information combiner signal (VFB) to the switching mode power supply.

37. A power supply circuit according to claim 34, characterized in that the voltage phase information combiner circuit includes a filter for selecting a rectified mains voltage wave-form from the voltage phase information signal and filtering out other frequency components, including a switching mode power supply switching frequency.

* * * * *